Jan. 26, 1965  J. H. PARCHER ETAL  3,167,371
SELECTOR INDEX

Filed Oct. 15, 1963  5 Sheets-Sheet 1

Inventors:
JAMES H. PARCHER
JACK W. WORSHAM
By George E. Frost-Keith J. Kulie
Attorneys

Inventors:
James H. Parcher
Jack W. Worsham
By George E. Frost-Keith J. Kulie
Attorneys Jan. 26, 1965   J. H. PARCHER ETAL   3,167,371
SELECTOR INDEX
Filed Oct. 15, 1963   5 Sheets-Sheet 4

Inventors
JAMES H. PARCHER
JACK W. WORSHAM
By George E. Frost - Keith J. Kulie
Attorneys Jan. 26, 1965   J. H. PARCHER ETAL   3,167,371
SELECTOR INDEX
Filed Oct. 15, 1963   5 Sheets-Sheet 5

Inventors:
James H. Parcher
Jack W. Worsham
By George E. Frost - Keith J. Kulie
Attorneys

# United States Patent Office 3,167,371
Patented Jan. 26, 1965

3,167,371
SELECTOR INDEX
James H. Parcher, Newtown Square, Pa., and Jack W. Worsham, Greensboro, N.C., assignors to Southern Plastics Engineering Corporation, Greensboro, N.C., a corporation of North Carolina
Filed Oct. 15, 1963, Ser. No. 316,276
9 Claims. (Cl. 312—319)

The present invention relates to a selector index and more particularly it relates to an improved drawer-type index apparatus adapted to select a predetermined sheet from a plurality of information sheets within a drawer and automatically to reset itself after each period of use.

Various forms of selector index mechanisms have been developed for selecting a predetermined information bearing sheet from a plurality of such sheets. Some such mechanisms involve a receptacle where the cover pivots up or over, depnding upon the type, carrying the unselected information sheets with it and exposing to view the selected sheet. Index mechanisms of the drawer type generally are relatively complex and for that reason expensive to produce and maintain.

The selector index apparatus of the present invention involves the drawer-type mechanism employing an improved selector means and related apparatus for inexpensive production and for durability in use. The apparatus includes a base upon which a telephone, or the like, may be positioned for convenience. The drawer is mounted for shuttle movement within the base, preferably being resiliently biased to drawer open position to move out freely upon release of the drawer locking mechanism. The information selector involves a push-button mechanism whereby depression of the selected button will release the drawer to open position and engage the selected information sheet for withdrawal with the drawer. A sheet retaining means, preferably in the form of a magnetic force, is provided to retain the unselected sheets within the base by engagement with means associated with each of the information sheets. The apparatus further includes selector resetting means automatically operative upon closing of the drawer to reset the selector to neutral position ready for the next use.

It, accordingly, is a general object of the present invention to provide an improved selector index.

Another object of the present invention resides in the provision of an improved selector index having selector means adapted to engage index means upon information sheets carried by the selector index.

A further object of the present invention resides in the provision of an improved selector index having selector resetting means to reset the selector to neutral position after each use.

Still another object of the present invention resides in the provision of an improved selector index having means releasably to retain the information sheets within the base of the selector.

An additional object of the present invention resides in the provision of an improved selector index having a drawer for support of the information sheets said drawer adapted to be released horizontally with respect to the base of the selector.

Another object of the present invention resides in the provision of an improved selector mechanism having selector means adapted to release the drawer of the selector and to select the desired information bearing sheet for movement in unison with the drawer.

A further object of the present invention resides in the provision of an improved selector index having a combination drawer latch and cam surface selector resetting member.

An additional object of the present invention resides in the provision of an improved apparatus operable by a push button selector mechanism for release of the drawer from the base and selection of the desired information sheet from the plurality of sheets stored in the selector.

Another object of the present invention is in the provision of an improved selector index that is economical to manufacture and assemble, that is easy to use, that is durable in use and that provides a positive selector control mechanism for use therein.

The novel features which are believed to be characteristic of the invention are set forth with particularity in the appended claims. The invention itself, however, together with further objects and advantages thereof, will best be understood by reference to the following description taken in connection with the accompanying drawings, in which:

Figure 1:
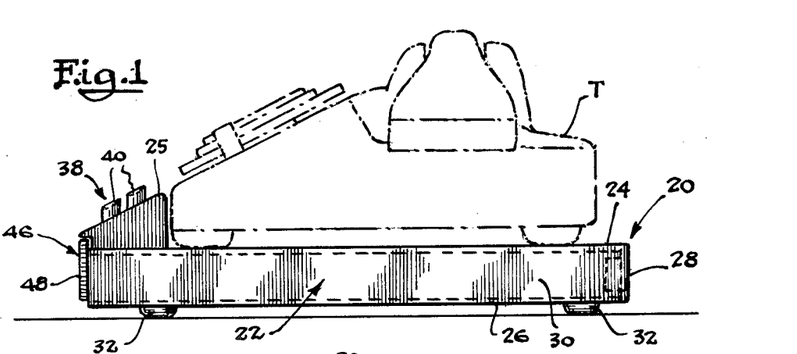
FIGURE 1 is a side elevation of one modification of the selector index of the present invention illustrating schematically a telephone resting upon the base of the selector.

Referring more particularly now to FIGURE 1 of the drawings the selector index apparatus is indicated generally at 20. The selector index includes a base 22 having a top wall 24, a bottom wall 26, a rear face 28 and side walls 30 (one shown). Non-skid support members 32 may be affixed to the bottom wall 26 of the base to provide non-skid support by means that will avoid scratching of the table, or the like, upon which the apparatus is positioned. As schematically illustrated in FIGURE 1, the apparatus of the present invention is well suited as a telephone index apparatus wherein a telephone T may be placed upon the top wall 24 of the selector.

The top wall 24 of the selector 20 defines an elevated portion 25 along a portion of its length adjacent the front of said selector.

Magnetic force producing means in the form of magnet bars 34 are affixed to the back wall 28 of the base by suitable attachment means such as the screw 36, or the like, and may be in the form of permanent magnets of aluminum, nickel, cobalt alloy composition of the type known in the art.

The elevated portion 25 of the top wall 24 of the base is adapted to receive the push button-type selector means 38 of the apparatus. This portion of the selector means includes a push button portion 40, exposed to view. The bottom 40 may be integral with or affixed to the depression block 42 which block is disposed within the base of the apparatus. A spring member 44 is integral with or affixed to the depression block 42 is mounted between the block 42 and the top wall 24 of the base. The assembly spring member 44 is adapted to bias the depression block 42 and button assembly to the positions shown in FIGURES 1 and 2. Depression of the button 40 and thereby the block 42 sets up a stress condition in the spring member 44 which in turn sets up stress opposing forces tending to return the spring member to its lowest stress level. When the manual pressure on the button is released this stress opposing force urges the spring member 44 to its static low stress level condition wherein the button 40 and block 42 will be in position substantially as indicated in FIGURES 1 and 2.

Figure 2:
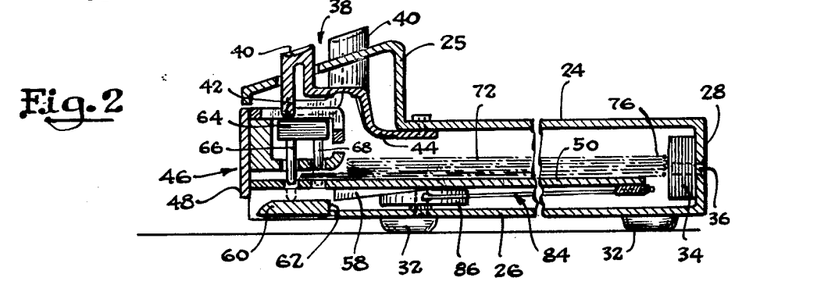
FIGURE 2 is a side elevation, in cross section, illustrating the selector means, drawer lock and release means and the resetting means of the apparatus with the drawer in closed position.
Figure 3:
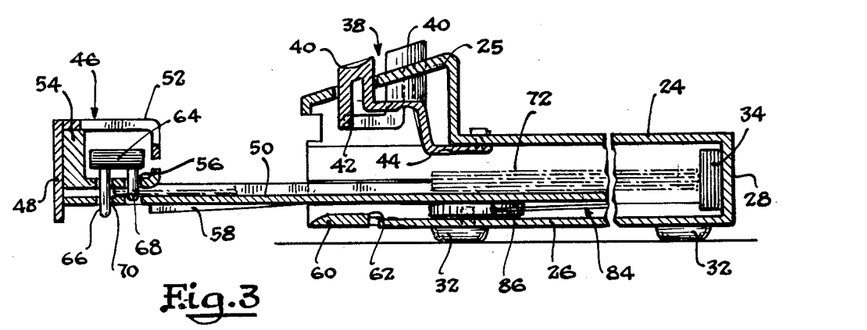
FIGURE 3 is a side view of the selector, as shown in FIGURE 2, with the drawer in open position and the selector means in selective position.

A drawer 46 is mounted for shuttle movement within the base 22 of the apparatus between closed position, as illustrated in FIGURE 2, and open position, as illustrated in FIGURE 3. The drawer 46 defines a front face 48 and a horizontally extending shelf portion 50 extending from said face into the open chamber defined by said base.

The selector mechanism support means is affixed to the front face of the drawer and includes a top flange 52 and base 54.

The drawer shelf 50 defines a downwardly extending lock projection 58, as illustrated in FIGURES 2 and 3. The lock projection 58 arcs down toward the drawer front and terminates in spaced relation to the front face 48 of the drawer in a plane below the lower face of the shelf 50 of said drawer. The projection 58 is adapted to engage in abutting relation the latch member 60 of the bottom wall 26 of said base when the drawer is in closed position, as indicated in FIGURE 2. The upstanding shoulder 62 of the latch 60 is adapted to engage the projection 58 when both the projection and the latch are in their respective static positions.

The selector mechanism of the drawer includes a base 64 which base supports a pair of pin projections 66 and 68 extending therefrom. The projection 66 is longer than the projection 68 and extends from the base 64 through an opening in the lower flange 56 of the support member and into the opening 70 in the shelf 50 of the drawer. The projection 68 extends from the base 64 of the selector mechanism into opening 56 of the extension of member 54. The extension of member 54 in which the projection receiving openings are provided preferably is inclined along the width of the drawer to accommodate the progressively increasing height of the tab extensions of the information bearing sheets.

Figure 4:
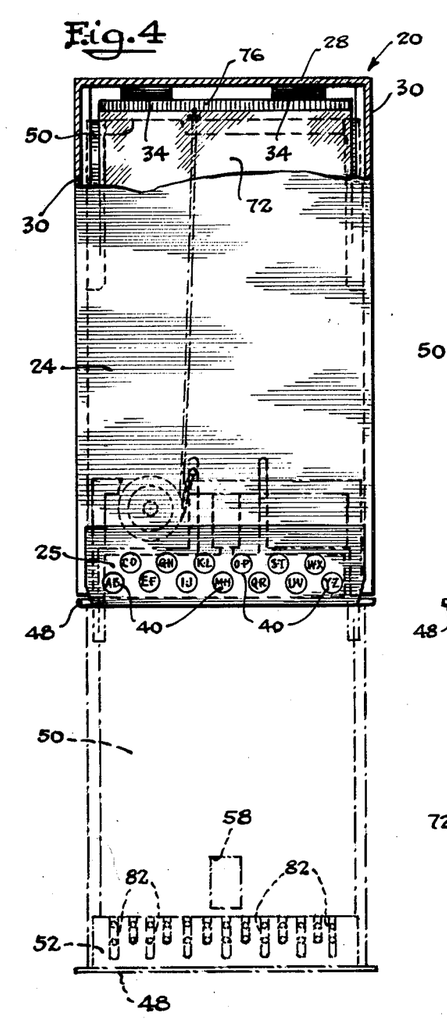
FIGURE 4 is a top view of the selector index, partly in section, with the door schematically illustrated in open position.
Figure 5:
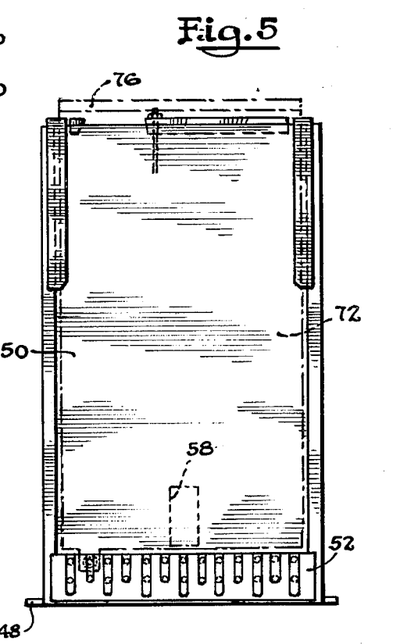
FIGURE 5 is a top plan view of the drawer of the selector index illustrating the drawer mounting member of the selector means.
Figure 6:
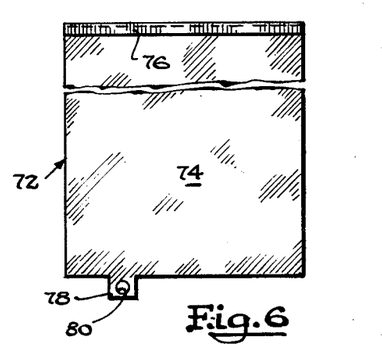
FIGURE 6 is a partial view of an information sheet adapted for use in the selector index of the present invention illustrating the metal strip along one edge thereof and the indexing means associated with each sheet.

In the form of the invention noted hereinabove, the selector mechanism extends fully across the front of the drawer 46. As shown in FIGURE 4, the buttons 40 are arranged in a staggered row across the width of the elevated portion 25 of the base and may have appropriate markings on the exposed upper face thereof to identify that portion of the information selectable upon depression of a specific button. In the present illustration the buttons are indicated as bearing letters of the alphabet each indicating that portion of the alphabetically indexed information retrievable upon depression of the selected button. Each of the buttons 40, as noted hereinabove, is provided with a depression block 42, as shown in FIGURES 2 and 3.

The top flange 52 of the selector mechanism support member defines a plurality of recesses 82 therein at spaced intervals therealong, each of the recesses 82 being in registration with the button 40 and depression blocks 42 of the selector apparatus. The depression blocks 42 are adapted to be received one within each of the recesses 82 of the selector support member.

A plurality of information bearing sheets 72 are adapted to be supported upon the shelf 50 of the drawer. Each of the information sheets 72 includes an area 74 for the information to be placed thereon; magnetically attachable means such as the strip indexing means 78 along an edge thereof. In the present apparatus the information sheets 72 are in the form of cards having a metal strip 76 along the rear edge thereof. The indexing means 78 is defined by a projection extending from the front edge of the card each such projection having an opening 80 therein of substantially the same diameter (or slightly larger) as the diameter of the projection 68 of the selector mechanism of the drawer.

Figure 7:
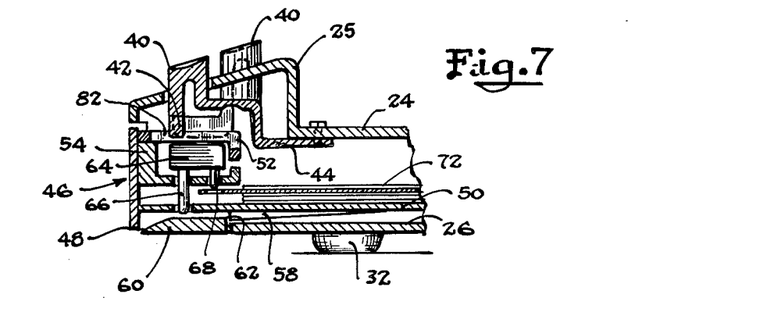
FIGURE 7 is a fragmentary view of the selector index illustrating the selector means in neutral position with the drawer closed.
Figure 8:
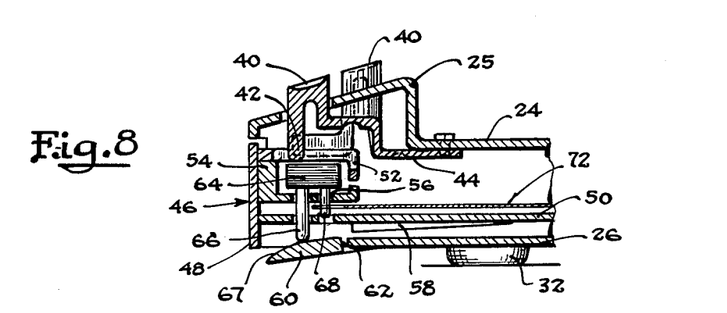
FIGURE 8 is a fragmentary view of the selector index of FIGURE 1 setting forth the operation of the selector means by depression of the push button selector member to release the drawer from locked positions and to engage the selected information sheet.

Operation of the selector mechanism may best be described in connection with FIGURES 7 through 9 of the drawings. As illustrated in FIGURE 7, in static or neutral position the button 40 and depression block 42 are in elevated position with the button 40 exposed to view extending through the top face of the top wall of the base. This button position, of course, is maintained by the spring member 44. The selector member 64, 66, 68 is in elevated position within its support member so that the base and projections extend to their uppermost point of travel within their support members. In this position the projection 66 is in spaced relation to the latch 60 of the base and the projection 68 is in spaced relation to the indexing portion of the information sheet which it is adapted to engage. The lock projection 58 is in abutting relation with the shoulder 62 of the latch 60 to prevent release of the drawer.

Upon depression of the selected button 40 the depression block 42 is moved downwardly into the recess 82 of the top flange 52 of the support member and into engagement with the base 64 of the selector member. Continued downward movement of the button 40 and thereby the depression block 42 will urge the base 64 and projections 66 and 68 downwardly. The projection 66 extends through the opening in the extension of member 54 and through the opening 70 in the shelf 50 of the drawer 46. Continued downward movement of the button 40 will bring the projection 66 into engagement with the latch 60 to deflect the latch 60 downwardly. The maximum downward travel of the selector member should be sufficient to permit the projection 66 to deflect the latch 60 a sufficient distance downward to move the shoulder 62 thereof out of the plane of travel of the lock projection 58 upon horizontal movement of the drawer 46 so that the projection 58 may move freely therepast. As illustrated in FIGURE 8 of the drawings, the latch 60 has been deflected downwardly out of abutting engagement with the lock projection 58 of the shelf 50 and out of the plane of travel of said projection. During the same downward movement of the base 64 to permit deflection of the latch 60 by the projection 66 the projection 68 will move downward through the mating opening 56 in the extension of member 54 and into the opening 80 of the mating indexing means 78 of the information sheet to be selected. Thus, with the above noted action of the selector member the drawer 46 is released for shuttle movement out of the base and the desired information sheet is engaged for movement in unison with the drawer.

As illustrated in FIGURES 2, 3 and 4, the drawer preferably is biased toward the open position so that when the drawer lock is released the drawer will move out of the drawer recess defined by the base and into position for convenient use with the desired information sheet exposed to the viewer. This biasing means, in the form illustrated, includes a spring member 84 one portion of which is wound in the form of a coil 86 and the other portion of which is taken from the coil and affixed to the rear of the shelf 50 of the drawer 46. The coiled portion 86 of the spring 84 is affixed to the base of the apparatus in the area defined between the shelf 50 of the drawer 46 and the bottom wall 26 of the base. It can readily be seen that when the drawer is released the spring member in attempting to seek its lowest stress level will tend to wind itself upon the coiled portion 86 and in so doing will pull the drawer 46 along with it to move the drawer out of the drawer recess in the base.

Each of the information sheets 72 is retained in the drawer recess of the base by magnetic force engagement of the magnetically attracted members 76 of each of the sheets with magnets 34 mounted at the rear of said recess. If none of the projections 68 are in engagement with indexing means on the sheets the drawer will move out of the base of itself without carrying information sheets with it. The drawer movement, in this instance, is independent of the movement and mounting of the information sheets and said sheets will be retained within the base recess by the magnetic force.

If a selector projection 68 is in engagement with the indexing means of one of the information sheets 72 said sheets will move in unison with the drawer 46. As illustrated in the drawings, and noted hereinabove, an integral unit is defined between the drawer 46 and the selector member as defined by the base 64 and projection 68 thereof and the information sheet selected. As the drawer moves outwardly away from the base under the action of the spring 84 the projection 68 in engagement with the indexing means of the information sheet will pull the sheet along with the drawer to expose it to the user. The remainder of the information sheets stored within the apparatus, including those both above and below the sheet selected, will not move out with the drawer but will remain in the drawer recess of the base due to the magnetic force attraction between the means 76 of each sheet and the magnetic force producing means 34 mounted at the base of the recess. Thus, with the action noted hereinabove, only the selected information sheet will move out with the drawer. The rear portion of the sheet selected and moved out with the drawer will remain in stacked relation in the stored information sheets in the drawer recess of the base so that when the drawer is returned into registration with the base the selected sheet will be restored to its proper position in stacked relation with respect to the remainder of the sheets.

The selector member remains in the lower or selective position during movement of the drawer to define an interconnection between the drawer and the selected information sheet at all times.

Figure 9:
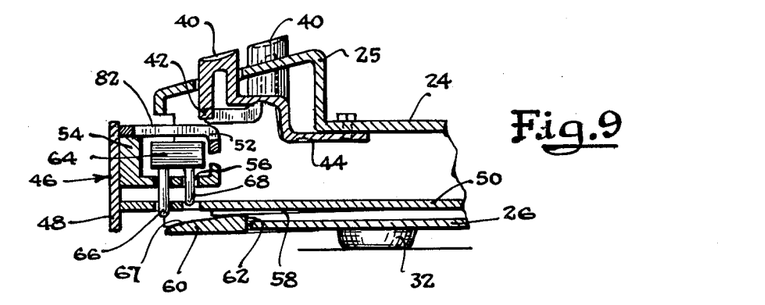
FIGURE 9 is a fragmentary view of the selector index, as shown in FIGURES 7 and 8, illustrating the resetting means for the selector.

Resetting of the selector member to neutral position is automatically accomplished upon return of the drawer 46 to the drawer recess in the base of the apparatus and will be readily understood by reference to FIGURE 9. The projection 66 of the selector member is fully extended while the drawer is in open position due to the initial requirement that said projection move the latch 60 away from the engagement with the lock projection 58 of the drawer 46. As the drawer is moved toward the base for replacement within the drawer recess of the base the lock projection 58 passes over the upper face of the latch member. The lock projection 58 is sufficiently resilient to move upwardly toward the shelf upon engagement with the latch without precipitating significant deflection of the latch member. As the drawer is moved further toward the base the projection 66, as shown, will engage the sloping cam face 67 of the latch member 60. The projection will ride upwardly along the cam face 67 thereby pushing the base 64 and projection 68 upwardly along with it until it reaches the top face of said latch 60 at which time the selector member is fully reset and restored to its neutral position. During this action, of course, the projection 68 is moved to a position out of engagement with the opening 80 in the indexing means of the information sheet 72. At the time the projection 68 is moved away from engagement with the mating indexing means of the selected information sheet the metal strip 76 of the sheet is within the magnetic influence of the magnets 34 whereby the information sheet is repositioned to its neutral position in registration with its respective selector means. Thus, the apparatus is fully reset upon each return of the drawer to its closed position so that the selector apparatus and information sheets will be free and ready for the next selection or operation, succeeding operations being in no way affected by any preceeding operation.

The engagement of the projection 66 and 68 of the selector member is sufficiently tight in sliding fit so that the projections and attached base member 64 will remain in vertical position at any point along their length when moved thereto by external action. With this assembly there is no requirement for biasing springs for the selector member to assure its operation of positioning either to neutural or to selective position.

Another embodiment of the present invention is illustrated in FIGURES 10 through 15 of the drawings. The modified selector index is indicated generally at 90. The selector includes a base 92 and a drawer 94. The bases includes a rear wall 96, top wall 98, side walls 100 and bottom wall 102.

Figure 10:
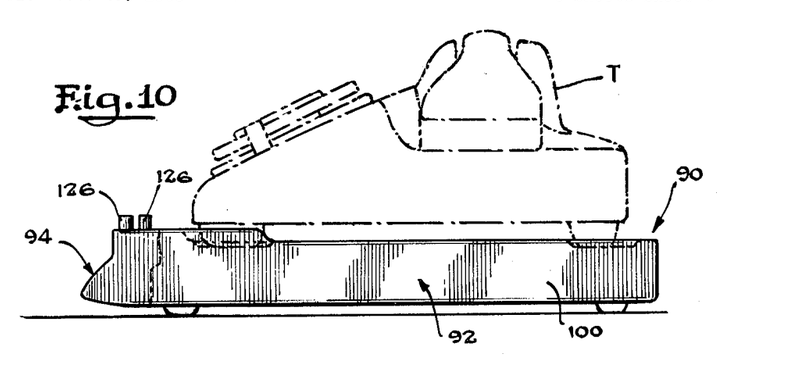
FIGURE 10 is a side elevation of a modified form of the selector index of the present invention illustrating schematically a telephone resting upon the base of the selector.

As schematically represented in FIGURE 10, the upper wall 98 of the apparatus may be formed to receive a telephone T thereon in supporting relation thereto with an index apparatus defining the base.

Figure 11:
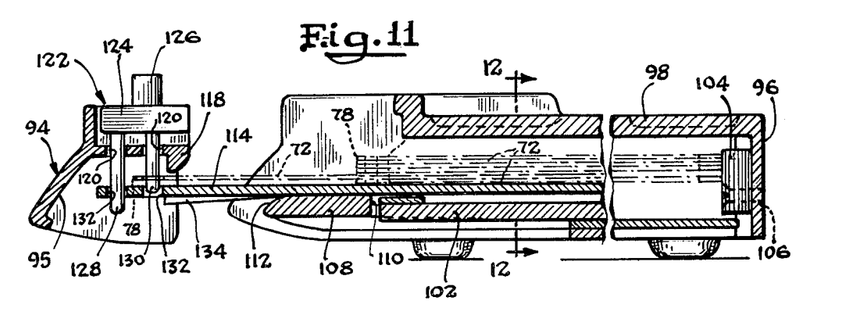
FIGURE 11 is a side view of the selector of FIGURE 10, in section.

Magnet means 104 are affixed to the rear wall 96 of the apparatus, as illustrated in FIGURE 11 of the drawings. The magnet means 104 may be affixed to the wall 96 by screws 106 or other suitable retaining means.

A latch 108 affixed to the bottom wall 102 of the apparatus and resiliently extending therefrom is adapted to provide deflectable lock means releasably to hold the drawer 94 in closed position and to provide resetting means, each as defined in greater detail hereinbelow. The latch 108 defines an inwardly facing shoulder 110 and a cam face 112 thereon.

Figures 12, 13:
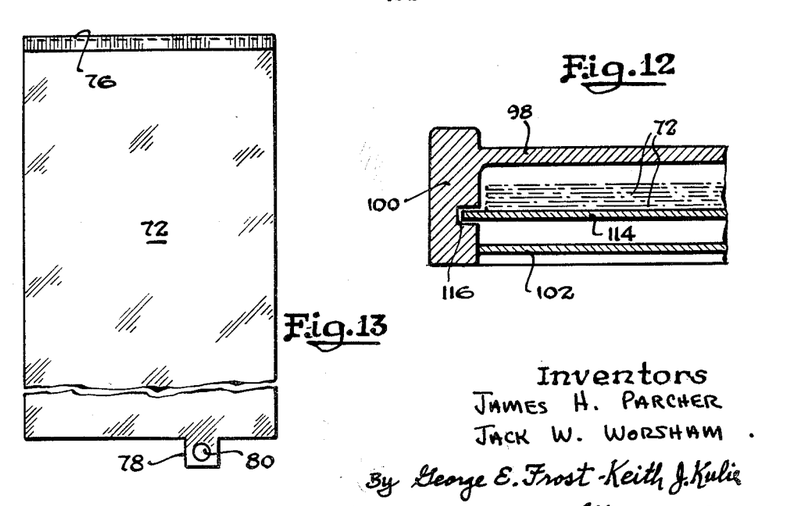
FIGURE 12 is a fragmentary sectioned view showing, in part, the base and the mounting of the drawer for movement therein.
FIGURE 13 is a plan view of an information sheet of the type adapted for use in the selector index of the present invention.
Figure 14:
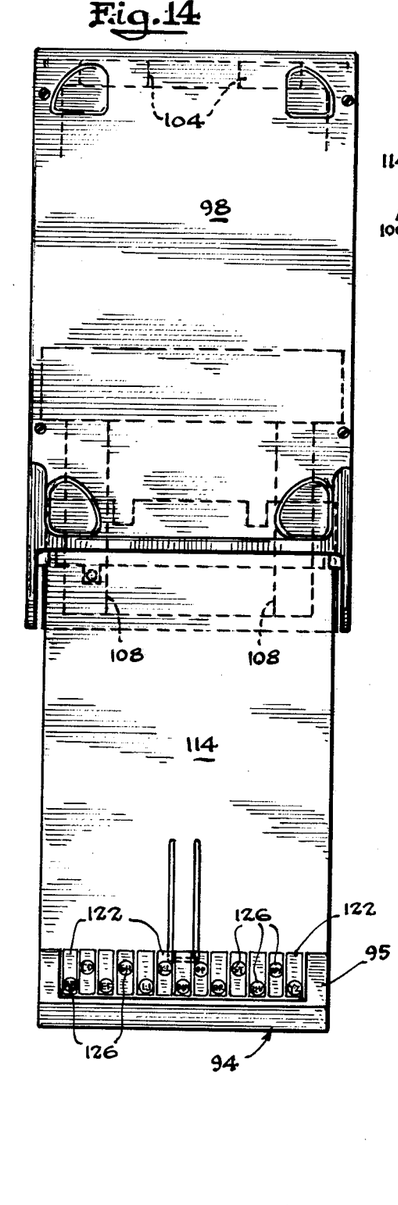
FIGURE 14 is a top plan view of the selector index of FIGURE 10 with the drawer in open position.
Figure 15:
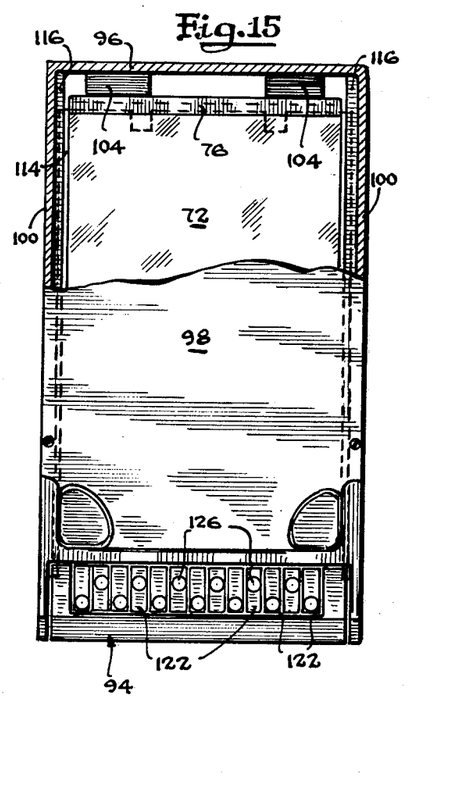
FIGURE 15 is a view of the selector of FIGURE 14, partly in section, with the drawer in closed position.

The drawer 94 includes a drawer shelf 114 adapted to receive and hold the information sheets 72 in stacked position within the chamber defined by the walls of the index apparatus. The drawer shelf 114 affixed at one end to the drawer front 95 and extends in a free end into the walled chamber of the apparatus when assembled. The rear terminal of the free end of the drawer, of course, extends to a position in close proximity with the back wall 96 of the index apparatus when the drawer is in fully closed position, as in FIGURE 10. When the drawer 94 is opened to its full open position to expose the data on the selected information sheet the rearmost portion of the drawer shelf will still extend partially within the walled chamber of the index apparatus to provide support for the unselected information bearing sheets within the chamber and to sustain them in predetermined stacked relation within the apparatus. As illustrated in FIGURE 12 of the drawings, the drawer shelf 114 of the drawer is slidably received, in guided fashion within horizontally extending grooves 116 of the side walls 100 of the apparatus.

Each of the information bearing sheets 72 are provided with strips 76 of magnetizable material along the edge thereof that will extend in close proximity to the magnets 104 of the apparatus when the sheets are fully disposed within the apparatus. As illustrated schematically in FIGURE 11, the strips 76 are magnetically attracted by the magnets 104 of the apparatus to be held thereby unless withdrawn from the index apparatus in the manner to be defined hereinbelow.

The drawer front 95 of the drawer 94 includes the operating means of the index apparatus of the present invention. As indicated in FIGURE 11 the drawer front 95 is provided with a horizontal support projection 118. The projection 118 is provided with a plurality of openings 120 extending therethrough at spaced intervals therealong said openings 120 being paired aligned relation along axes parallel to the longitudinal axis of the index apparatus. A pair of openings 120 is provided for each index key 122. The index key includes a support base member 124 and a projection 126 extending from the base 124 and in the form shown herein defining button means upon which the desired index information may be impressed or provided. A pair of prongs 128 and 130 extend from the base 124 of the index key 122 in direction opposite to that of the button projection 126. One of the prong projections (128 in the form illustrated) is longer than the other of the pair. The prongs 128 and 130 are received within the openings 120 of the projection 118 of the drawer front in a tight sliding fit and will be frictionally supported vertically with respect to projection 118 in whatever position they are moved to under application of an external force. The drawer shelf 114 of the index apparatus is provided with openings 132 in coaxial relation with the openings 120 of the projection 118 to provide additional axial support for the projections when in operative selective position.

In operation of the apparatus the drawer will be held in closed position by abutting engagement of the lock projection 134 of the drawer shelf 114 with the shoulder 110 of the latch 108. This abutting engagement, of course, will occur only when the drawer 94 is in fully closed position within the apparatus. Release of the drawer is realized by depression of the desired index key 122. Depression of one of the index keys will move the prong 128 (longest prong) downwardly in the opening 120, through the opening 132 of the drawer shelf and into engagement with the latch 108 to deflect the latch downwardly and away from abutting engagement with the lock projection 134 of the drawer shelf 114. Suitable spring means, or the like, (such as described in conjunction with the modification of FIGURE 1 of the drawings) may be provided to bias the drawer to open position and thereby permit easy opening of the drawer by simple depression of one of the index keys 122 of the apparatus.

The prong 130 moves downward in unison with the prong 128 upon depression of the selected index key to move the prong 130 into engagement with the opening 80 of the index projection 78 of the desired information bearing sheet. Subsequent outward or opening movement of the drawer will carry along the selected information card with the drawer. It should be observed that the outwardly biasing force acting upon the drawer is in excess of the magnetic attraction between the magnets 104 and the strip 76 of the information bearing sheet. The strip 76 and the sheet will be moved away from the magnets 104 and outwardly of the walled chamber of the apparatus to expose the desired information to the user. The remainder of the information bearing sheets, however, will not move outwardly with the drawer since the magnetic attraction between the magnets 104 and the strips 76 of each of the sheets 72 is in excess of the frictional sliding engagement between the selected information sheet and those sheets immediately adjacent thereto. Of course, sheets spaced from the selected sheet will not be subjected even to this frictional sliding action and will not tend to move outwardly with the drawer.

Upon closing of the drawer the selector section of the apparatus is automatically reset to the original position to place the index apparatus in condition for subsequent use. It should be observed that when the drawer 94 is opened the projection 128 extends through the opening 132 in the shelf 114 and terminates in a plane below said shelf. Upon closing of the drawer 94 the projection 128 engaged the cam face 112 of the latch 108. The cam face forces the projection up along the inclined portion thereof to move the selector mechanism upwardly in its mounting base and to reset it to its normal rest position for subsequent use. The lock 134 will be deflected upwardly over the latch 108 upon return of the drawer 94 to close position until the drawer front terminal thereof passes inwardly beyond the shoulder 110 of the latch 108 wherein it returns to its static position in abutting engagement with said shoulder thereby locking the drawer in closed position. Of course, the projection 130 of the selection apparatus is moved out of engagement with the index projection 78 of the information bearing sheet simultaneously with movement of the projection 128 upwardly along the cam face 112 of the latch 108. The information sheet at this time, however, is carried a sufficient distance within the chamber of the index apparatus so that the metal strip 76 is magnetically attracted by the magnets 104 of the apparatus to be engaged thereby and to magnetically affix the information sheet within said chamber until selected in subsequent operation of the apparatus.

While a specific embodiment of the present invention is shown and described it will, of course, be understood that other modifications and alternative constructions may be used without departing from the true spirit and scope of the invention. It is intended by the appended claims to cover all such modifications and alternative constructions as fall within their true spirit and scope.

What we claim as new and desire to secure by Letters Patent of the United States, is:

1. A selector index apparatus carrying a plurality of information sheets each sheet having index means thereon, said selector index comprising: a base having a deflectable latch member defining a cam surface thereon; a drawer mounted for shuttle movement in said base between open and closed positions, said drawer having lock means adapted to engage the latch means of the base to releasably lock the drawer in closed position; selector means on said apparatus adapted for movement between neutral and selective positions, said selector means including a first member to engage and to deflect said latch member away from engagement with the lock means of the drawer when said selector means is in selective position and a second member adapted to engage the index means of the selected information sheet when said selector means is in selective position, the cam surface of said latch means adapted cammingly to engage one of said members of the selector means to reset the selector means from selective to neutral position upon movement of said drawer from open to closed position.

2. A selector index apparatus carrying a plurality of information sheets each sheet having index means thereon, said selector index comprising: a base having a deflectable latch member with one edge thereof defining a cam surface; a drawer mounted for shuttle movement in said base between open and closed positions, said drawer having a lock projection to abut against said deflectable latch in drawer closed position; selector means on said apparatus adapted for movement between neutral and selective positions, said means defining a base having projections extending therefrom, one of said projections adapted to engage and to deflect said latch member away from abutting engagement with the lock projection of the drawer, another of said projections adapted to engage the index means of the selected information sheet, the cam surface of said latch means adapted to cammingly engage one of the projections of said selector means to reset the selector means from the selective position to neutral position upon movement of said drawer from open to closed position.

3. A selector index apparatus carrying a plurality of information sheets each sheet having index means thereon, said selector index comprising: a base having a deflectable latch member and defining a cam surface; a drawer mounted for shuttle movement in said base between open and closed positions, said drawer having a lock projection to engage said deflectable latch in drawer closed position; selector means mounted on said drawer and adapted for movement between neutral and selective positions, said selector means including a pair of projections, one of said projections adapted to engage and to deflect said latch member away from abutting engagement with the lock projection of the drawer when the selector means is in selective position, the other projection adapted to engage the index means of the selected information sheet when the selector means is in selective portion, the cam surface of said latch means adapted cammingly to engage said one projection to reset the selector means from the selective position to neutral position upon movement of the drawer from open to closed position.

4. A selector index apparatus carrying a plurality of information sheets each sheet having index means thereon, said selector index comprising: a base having a deflectable latch member and defining a cam surface; a drawer mounted for shuttle movement in said base between open and closed positions, said drawer having a lock projection to engage said deflectable latch in drawer closed position; selector means mounted on said drawer and adapted for movement between neutral and selective positions, said selector means including a pair of projections, one of said projections adapted to engage and to deflect said latch member away from abutting engagement with the lock projection of the drawer when the selector means is in selective position, the other projection adapted to engage the index means of the selected information sheet when the selector means is in selective position, the cam surface of said latch means adapted cammingly to engage said one projection to reset the selector means from the selective position to neutral position upon movement of the drawer from open to closed position; and index means mounted on said base in operative engagement with said selector means to move said selector means from neutral to selective position upon application of an external force.

5. A selector index apparatus carrying a plurality of information sheets each sheet having index means thereon and metal strips along one edge thereof, said selector index comprising: a base having a deflectable latch member and defining a cam surface; a drawer mounted for shuttle movement in said base between open and closed positions and adapted to support said information sheets in the apparatus, said drawer having a lock projection to engage said latch in drawer closed position; selector means mounted on said drawer and adapted for movement between neutral and selective positions, said means having a pair of projections extending therefrom, one of said projections adapted to engage and to deflect said latch member away from abutting engagement with the lock projection of the drawer when the selector means is in selective position, the cam surface of said latch means adapted cammingly to engage one of said projections to reset the selector means from the selective positions to neutral position upon movement of the drawer from open to closed position; and magnet means affixed to the base and adapted magnetically to engage the metal strips of the unselected information sheets to retain them within the base during movement of the drawer from closed to open position.

6. A selector index apparatus carrying a plurality of information sheets each sheet having index means thereon and metal strips along one edge thereof, said selector index comprising: a base having a deflectable latch member and defining a cam surface; a drawer mounted for shuttle movement in said base between open and closed positions and adapted to support said information sheets in the apparatus, said drawer having a lock projection to engage said latch in drawer closed position; selector means mounted on said drawer and adapted for movement between neutral and selective positions, said means having projections extending therefrom, one of said projections adapted to engage and to deflect said latch member away from abutting engagement with the lock projection of the drawer when the selector means is in selective position, another of said projections adapted to engage the index means of the selected information sheet when the selector means is in selective position, the cam surface of said latch means adapted cammingly to engage one of said projections to reset the selector means from the selective position to neutral position upon movement of the drawer from open to closed position; index means mounted on said base in operative engagement with said selector means to move said selector means from neutral to selective position upon application of an external force; and magnet means affixed to the base and adapted magnetically to engage the metal strips of the information sheets to retain the unselected sheets within the base during movement of the drawer from closed to open position.

7. A selector index apparatus carrying a plurality of information sheets each sheet having index means thereon and metal strips along one edge thereof, said selector index comprising: a base having a deflectable latch member and defining a cam surface; a drawer mounted for shuttle movement in said base between open and closed positions and adapted to support said information sheets in said apparatus, said drawer having a lock projection adapted to engage said latch to releasably lock the drawer in closed position; selector means on said drawer adapted for movement between neutral and selective positions, said means having a pair of projections extending therefrom, one of said projections adapted to engage and to deflect said latch member away from abutting engagement with the lock projection of the drawer when the selector means is in selective position, the other projection adapted to engage the index means of the selected information sheet, said selector means remaining in selective position in engagement with the selected information sheet during drawer open condition, the cam surface of said latch means adapted cammingly to engage said one projection and to reset the selector means from selective to neutral position; and, a magnet affixed to the base in registration with the metal strip portions of the plurality of information sheets and adapted magnetically to engage said metal strips to retain the unselected information sheets within the base during movement of the drawer to open position.

8. A selector index apparatus carrying a plurality of information sheets each sheet having index projections along one side thereof and metal strips along the opposite side thereof, said selector index comprising: a base having a deflectable latch member and defining a cam surface thereon; a drawer mounted for shuttle movement in said base between open and closed positions, said drawer having lock means adapted to engage the latch means of the base to releasably lock the drawer in closed position, said drawer defining shelf means disposed within the base in all drawer positions and providing support for the information sheets in stacked relation thereon; selector means mounted to said drawer and adapted for movement between neutral and selective positions, said selector means including a first member to engage and to deflect said latch member away from engagement with the lock means of the drawer when said selector means is in selective position and a second member adapted to engage the index projection of the selected information sheet when said selector means is in selective position, the cam surface of said latch means adapted cammingly to engage one of said members of the selector means to reset the selector means from selective to neutral position upon movement of said drawer from open to closed position.

9. A selector index apparatus carrying a plurality of information sheets each sheet having index means thereon, said selector index comprising: a base having a deflectable latch member and defining a cam surface; a drawer mounted for shuttle movement in said base between open and closed positions, said drawer having a lock projection to engage said deflectable latch in drawer closed position, said drawer having a shelf to support the information sheets in stacked relation thereon; selector means mounted on said apparatus and adapted for movement between neutral and selective positions, said selector means including a pair of projections mounted on the drawer, one of said projections adapted to engage and to deflect said latch member away from abutting engagement with the lock projection of the drawer when the selector means is in selective position, the other projection adapted to engage the index means of the selected information sheet when the selector means is in selective position, each said selector means further including an indexed operator member mounted on the base in operative relation with the projections of the selector means, adapted cammingly to engage said one projection to reset the selector means from the selective position to neutral position upon movement of the drawer from open to closed position.

References Cited by the Examiner

UNITED STATES PATENTS

| | | | |
|---|---|---|---|
| 1,658,363 | 2/28 | Watters et al. | 312—319 |
| 1,821,459 | 9/31 | Casey | 129—16.1 |
| 2,401,060 | 5/46 | Fahlstedt | 129—16.1 |
| 2,423,645 | 7/47 | Fahlstedt | 129—16.1 |
| 2,593,475 | 4/52 | Neilsen | 40—104 |
| 2,957,260 | 10/60 | Zandelin | 40—104 |
| 2,968,110 | 1/61 | Quarnstrom | 40—336 |

FOREIGN PATENTS 1,093,104   11/54   France.

FRANK B. SHERRY, *Primary Examiner.*